UNITED STATES PATENT OFFICE.

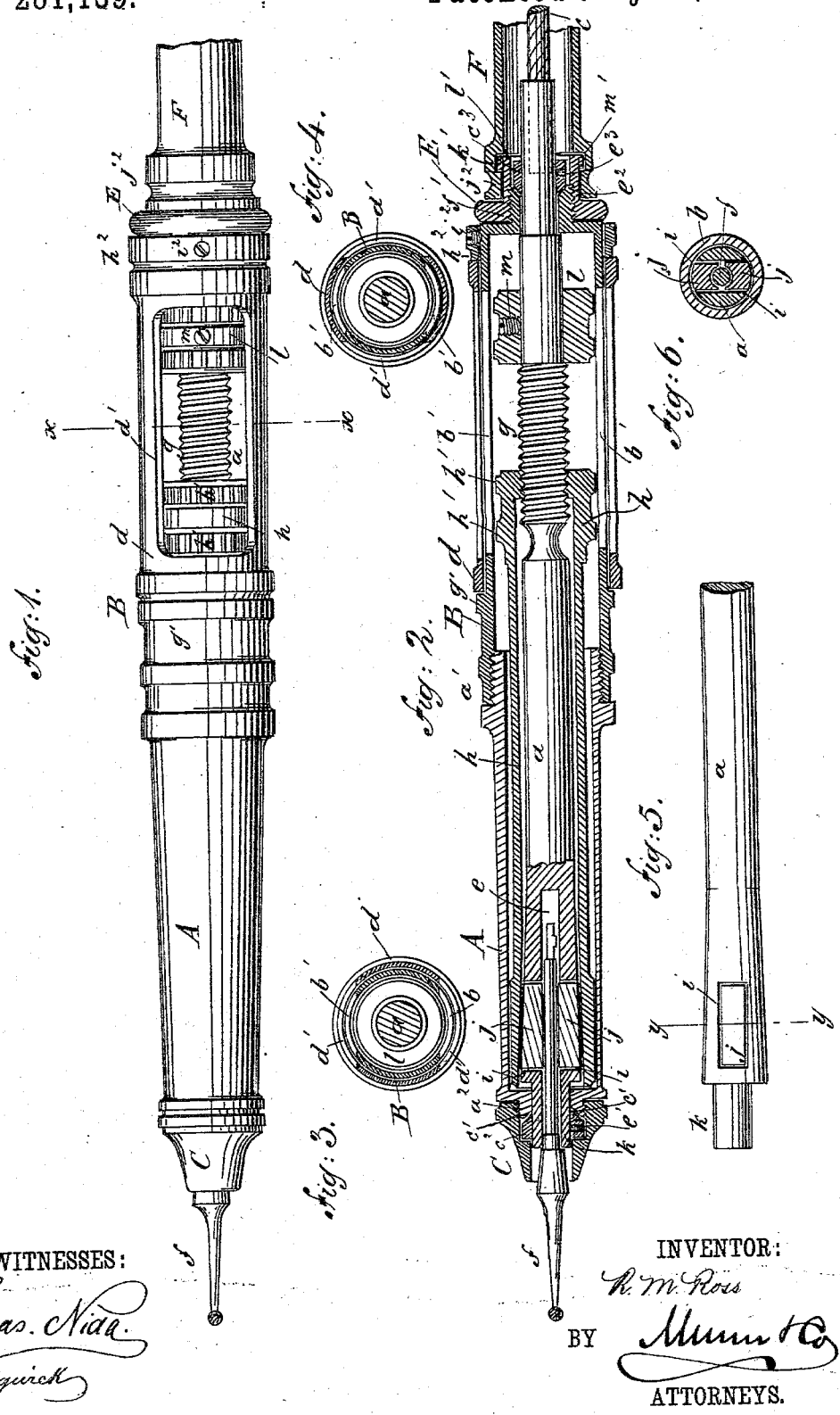

ROBERT M. ROSS, OF UTICA, NEW YORK.

DENTAL-DRILL HAND-PIECE.

SPECIFICATION forming part of Letters Patent No. 281,139, dated July 10, 1883.

Application filed March 30, 1883. (Model.)

*To all whom it may concern:*

Be it known that I, ROBERT M. ROSS, of Utica, in the county of Oneida and State of New York, have invented a new and Improved Hand-Piece for Dental Drills, of which the following is a full, clear, and exact description.

This invention relates to improvements in dental engines, and has for its object to adapt the same to hold tools having shanks of different sizes, and to promote convenience in holding the engine.

Reference is to be had to the accompanying drawings, forming part of this specification, in which similar letters of reference indicate corresponding parts in all the figures.

Figure 1 is a plan view of my new and improved hand-piece. Fig. 2 is a longitudinal sectional elevation of the same. Figs. 3 and 4 are transverse sectional elevations of the hand-piece, taken on the line $x\ x$ of Fig. 1, showing the outer shell, $d$, in its different positions. Fig. 5 is a plan view of the spindle and clamping-blocks removed from the sleeve $h$, and Fig. 6 is a transverse sectional elevation taken on the line $y\ y$ of Fig. 5.

The letter $a$ in the drawings represents the central spindle of the hand-piece, which spindle is revolved by the flexible connection $c$, which connects its rear end with the motive power. The forward end of the spindle $a$ is bored axially, as shown at $e$, for the reception of the shank of the drilling-tool $f$, and is recessed on opposite sides through to the bore $e$, as shown at $i\ i$, for the reception of the clamping jaws or blocks $j\ j$, and at its extreme forward end the spindle is reduced, as shown at $k$, to form a suitable journal where it passes through the forward end of the forward section, A, of the outer casing, and near the center of its length the spindle is formed with the screw-threads $g$, for forcing backward and forward upon the spindle the sleeve $h$, for operating the jaws $j\ j$, for clamping and releasing the shank of the drilling-tool. The sleeve $h$ is milled at its rear end, as shown at $h'$, to facilitate the turning of the sleeve, and at its forward end it is made slightly flaring to fit over the clamping blocks or jaws $j\ j$, which are made slightly wedge-shaped, so that upon the outward movement of the sleeve $h$ the jaws or blocks $j$ will be forced inward for grasping the shank of the tool. For holding the spindle $a$ while the sleeve $h$ is being turned for clamping or releasing the tool, I provide it with the milled nut $l$, secured thereto in rear of the screw $g$ by the set-screw $m$. This nut $l$ also serves as a stop to prevent the sleeve $h$ being turned backward too far upon the spindle $a$. The rear end of the forward section, A, of the outer casing is slightly reduced and screw-threaded, as shown at $a'$, so that the forward end of the rear section, B, of the outer casing may be screwed upon it, as shown in Fig. 2, and the forward end of the said section A is reduced and also screw-threaded, as shown at $a^2$, to receive the cap C, and the forward end of this reduced portion $a^2$ is countersunk, as shown at $c'$, to receive the conical adjustable jam-nut $c^2$, which is held upon the reduced portion $k$ of the spindle $a$ by the set-screw $e'$, and which serves to limit the forward motion of the sections A B, forming the outer casing, and to take up the wear of the spindle $a$. The rear end of the section B of the outer casing is also reduced and screw-threaded, as shown at $f'$, to receive the swivel-nut E, and the end of this reduced and threaded portion $f'$ is also countersunk, as shown at $e^2$, to receive the conical adjustable jam-nut $c^3$, which is held upon the spindle $a$ by the set-screw $e^3$, and serves to limit the backward movement of the sections A B of the outer casing; and the section B of the outer casing is apertured on opposite sides, as shown at $b'\ b'$, to form finger and thumb passages for grasping the nut $l$ and milled portion $h'$ of the sleeve $h$, for turning the spindle or sleeve for causing the jaws $j\ j$ to grasp or release the drilling-tool. For closing the apertures $b'\ b'$ when the hand-piece is in use, I place upon the section B the shell $d$, which is apertured, as shown at $d'\ d'$, to correspond with the apertures $b'\ b'$ in the section B, as shown clearly in Fig. 3, so that by turning the shell $d$ the apertures $b'\ b'$ in the section B may be opened or closed, as will be understood from Figs. 3 and 4. The shell $d$ is held upon the section B by means of the enlargement $g'$ and removable ring $h^2$, that is held upon the rear portion of the section B by the set-screw $i^2$.

The swivel-nut E is for holding the shield F, which incloses the flexible power-connection $c$. In forming the swivel the ring $j^2$ is first placed loosely upon the tube portion $l'$ of the nut E. The thin ring $k'$ is then soldered to the said tube portion $l'$. The rear end of the shield F is enlarged, as shown at $m'$, to receive the thin ring $k'$, and the shield is then placed over the said ring $k'$ and soldered at its edge to the rear edge of the loose ring $j^2$, thus forming a perfect and durable swivel.

Constructed in this manner the hand-piece is made very practical, since it can be all taken apart for cleaning, and may be very easily and quickly operated for replacing the drilling-tool, and by means of the jaws or blocks $j\ j$, sleeve $h$, and spindle $a$ the same hand-piece is adapted to hold drilling-tools of all sizes.

Having thus described my invention, what I claim as new, and desire to secure by Letters Patent, is—

In a dental engine, the combination, with the flared spindle $a$, having the jaws $j$, the reduced end $k$, the screw-threaded portion $g$, and the stop $l$, of the casing A B, having the reduced end adapted to fit upon the reduced end $k$ of the spindle, and having screwed upon its forward end the cap C, and connected to its opposite end the swiveled shield F, the reduced end of the casing having a countersink, $c'$, to receive the conical adjustable jam-nut $c^2$, and the sleeve $h$, adapted to fit upon the wedges $j$ of spindle $a$, and to work upon the screw $g$ of the same, substantially as and for the purpose set forth.

ROBERT M. ROSS.

Witnesses:
WILLIAM P. CASE,
JOSEPH JOYCE.